H. T. ROBERTS.
SPARK TIMING MECHANISM.
APPLICATION FILED NOV. 16, 1916.
1,274,083.
Patented July 30, 1918.
2 SHEETS—SHEET 1.
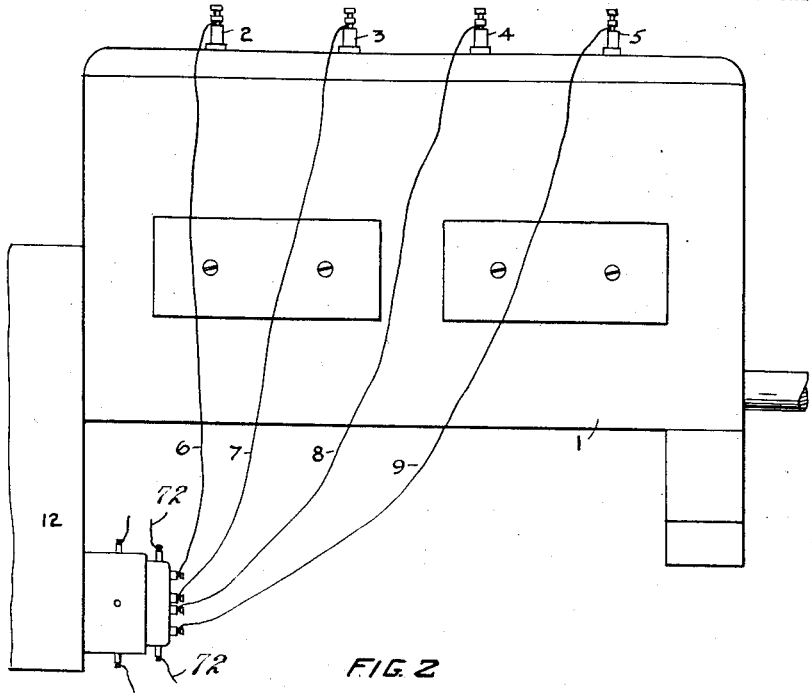
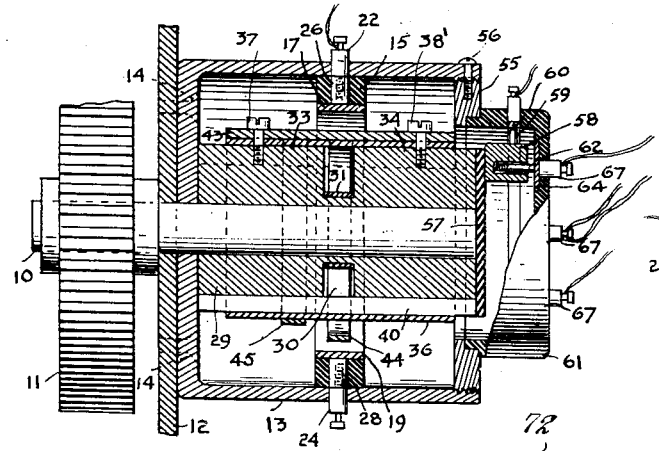
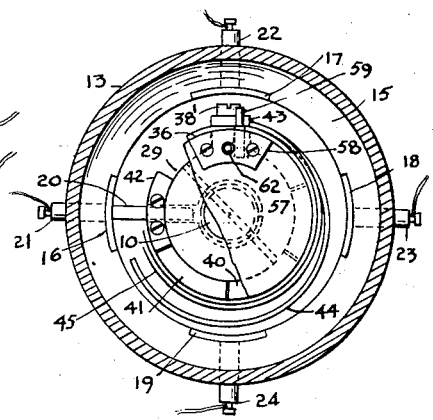
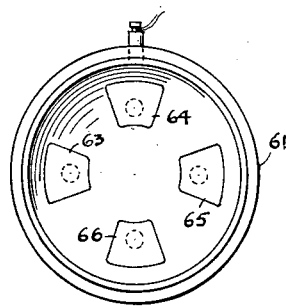
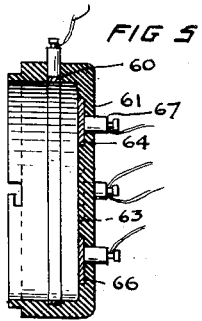
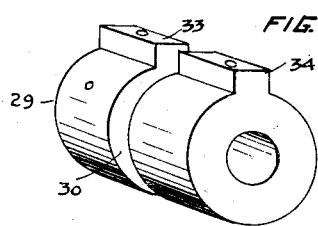
INVENTOR.
HARRY T. ROBERTS
BY
Carlos P. Griffin
ATTORNEY.

H. T. ROBERTS.
SPARK TIMING MECHANISM.
APPLICATION FILED NOV. 16, 1916.
1,274,083.
Patented July 30, 1918.
2 SHEETS—SHEET 2.
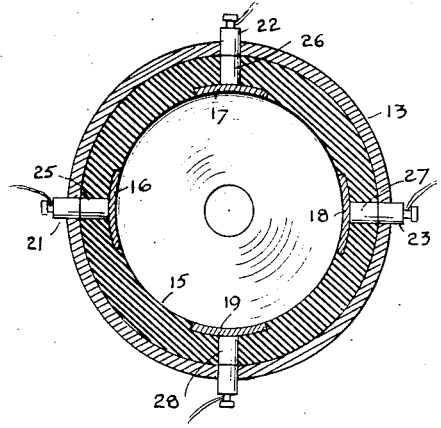
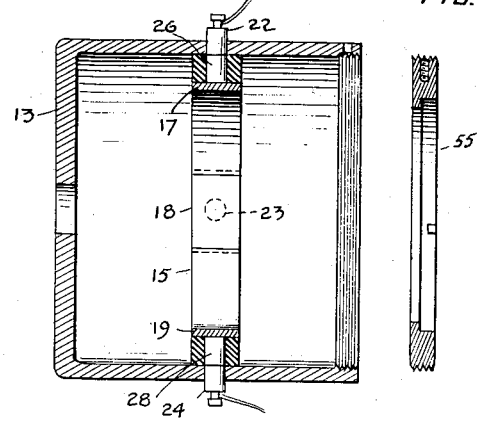
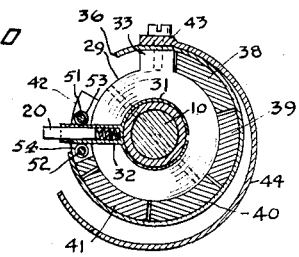
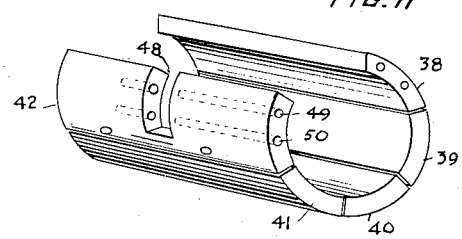
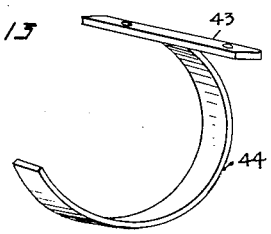
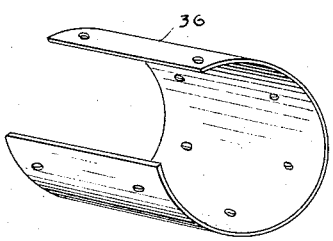
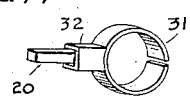
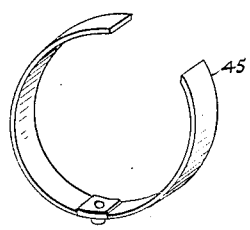
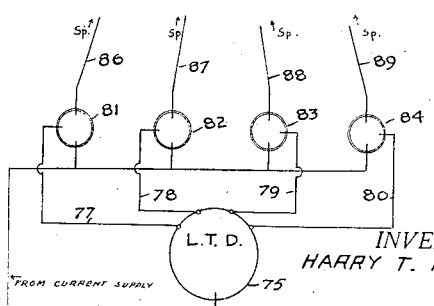
INVENTOR.
HARRY T. ROBERTS
BY
Carlos P. Griffin
ATTORNEY.

UNITED STATES PATENT OFFICE.

HARRY T. ROBERTS, OF SAN FRANCISCO, CALIFORNIA.

SPARK-TIMING MECHANISM.

1,274,083. Specification of Letters Patent. Patented July 30, 1918.

Application filed November 16, 1916. Serial No. 131,775.

*To all whom it may concern:*

Be it known that I, HARRY T. ROBERTS, a citizen of the United States, residing at San Francisco, in the county of San Francisco, State of California, have invented a new and useful Spark-Timing Mechanism, of which the following is a specification in such full and clear terms as will enable those skilled in the art to construct and use the same.

This invention relates to the spark timing mechanism used for delivering ignition current to the spark plugs of an explosion engine.

An object of the invention is to produce a simple and effective form of automatic spark advancing mechanism capable of supplying any number of spark plugs by merely increasing or diminishing the number of segments used in the distribution.

Other objects of the invention will appear as the description proceeds.

An embodiment of the invention is shown in the drawings in which the same reference numeral is applied to the same portion throughout, but I am aware that there may be many modifications thereof.

Figure 1 is a side elevation of an engine block casting showing the application of this distribution apparatus thereto.

Fig. 2 is a vertical sectional view through this distribution apparatus.

Fig. 3 is an end elevation of the distribution apparatus with the outer cover removed therefrom, and a portion of one of the inner insulating plates broken away for the purpose of illustration.

Fig. 4 is a view in elevation of the outer cap looking at it from the inside.

Fig. 5 is a vertical sectional view of the outer cover cap.

Fig. 6 is a perspective view of the block for driving the spark advancing mechanism.

Fig. 7 is a transverse vertical sectional view of the insulating device or case surrounding the primary distribution apparatus.

Fig. 8 is a longitudinal vertical sectional view of the main cover shown in Fig. 7.

Fig. 9 is a vertical sectional view of the end closure of the main casing.

Fig. 10 is a transverse vertical sectional view of the spark advancing mechanism.

Fig. 11 is a perspective view of the weights which advance the primary make and break brush removed from their supports.

Fig. 12 is a perspective view of the spring used to hold the weights shown in Fig. 11.

Fig. 13 is a perspective view of the mechanism for preventing the spark from being advanced too far and the weights from flying out too far.

Fig. 14 is a perspective view of the brush used in the low tension current for advancing the spark.

Fig. 15 is a diagrammatic view of the low tension distributer as used in conjunction with four induction coils, and Fig. 16 is a perspective view of a spring used for increasing the resistance of the main spring whereby the spark will not be advanced as far as it otherwise would be at a given speed.

Fig. 17 is a perspective view of the block carrying the high tension brushes.

The numeral 1 indicates a motor which in the present instance is provided with spark plugs, 2, 3, 4 and 5, which are connected by means of the cables 6, 7, 8 and 9, with the high tension side of the distributer. This apparatus is driven from any suitably timed shaft 10, which is connected with the other rotating shafts of the engine by means of the gear 11, within the casing 12 at the end of the engine. The distributer is mounted in a casing 13 made of a suitable high resistance fiber to insulate all of the contacts leading thereto save such as are grounded at the proper time. The casing 13 is cylindrical and is secured by means of suitable screws 14 to the engine casing 12 and near its center it has an insulated fiber ring 15, which ring has in the present instance four contact segments 16, 17, 18 and 19 let thereinto, so that the ring and said segments form a smooth track for the brush 20. The ring 15 is secured in position by means of the four binding posts 21, 22, 23, 24, which are screwed into corresponding lugs 25, 26, 27, and 28, on each of the aforesaid segments. Mounted on the shaft 10 is a boss 29 grooved at 30 to receive the encircling spring 31, which has a holder 32 for the brush 20. The boss 29 has two projecting lugs 33, 34, which form the means for carrying the timing brush and brush advancing mechanism. The brush advancing mechanism consists of a single broad flat thin spring 36, which is secured to the lugs 33, 34, by means of the two screws 37, 38'. This spring has five segmental weights 38 to 42 inclusive secured within the same so that when not under the action of centrifugal force said weights lie closely in contact with the boss 29 as illustrated in Fig. 10. The screws 37, 38' also hold a bar 43 in place over the spring 36, which bar is provided with a substantially rigid ring 44, which ring partially encircles the spring 36 at a distance therefrom to prevent the spring 36 from expanding more than a fixed amount, the object being to prevent the spark from being advanced more than it should be. In order to adjust the movement of the spring 36, springs 45 of different weights may be provided to increase the tension of spring 36 as much as may be necessary. The weight 42 is notched at a suitable point, the notch, for purposes of illustration being shown at the center as indicated at 48, and it has two holes 49, 50, therein, which holes receive two long screws or other suitable elements 51, 52, which carry two small rollers 53, 54, said rollers bearing upon the brush holder 32, and carrying it and the brush 20 around. When the speed of the rotary timed member increases, the spring 36 will move outwardly under the influence of centrifugal force due to its weights and when speed of the said member decreases the spring will move inwardly under the influence of its spring action or tendency to return to its normal position. This will result in moving the brush holder in one direction when the speed of the shaft or member 10 increases and in the opposite direction when the speed of the same decreases. A flat ring 55 having its exterior edge threaded, forms a partial closure for the casing 13, and its precise position with respect thereto is determined by means of the screw 56. The segment 38 has a plate 57 of insulated material secured thereto, and the block 58 is also secured to the end of the weight 38. The block 58 has a brush 59 extending outwardly therefrom to ride on a metallic track 60 encircling the block 58, and carried by the insulated cover cap 61. The block 58 is also provided with a brush 62 extending therefrom in a line parallel to the axis of the shaft 10, which brush is adapted to pass over the four metallic segments 63 to 66 inclusive, said segments having binding posts 67 connected therewith in a well known manner, and which extend outside the cap 61 to be connected with the spark plug cables 6 to 9. The brushes 59 and 62 in the block 58 are each inserted in metallic tubes or other suitable holders 70, 71, which brushes are placed in contact with each other to provide a path for the flow of the electric current from the ring to the segments 63 to 66 inclusive.

The operation of the timer is as follows:—

Assuming the primary and secondary wires to be connected with an induction coil, forming no part of the present invention and therefore not illustrated, the brush 20 will make and break the primary circuit as it is rotated around the contacts 16 to 19 inclusive, and as the current is made and broken through said contacts, high tension current will be delivered to the cable 72 connected with the ring 60, and as the current is delivered to said ring it will be delivered to the proper segment 63 to 66 by the brushes 59 and 62, and will travel from there to the several spark plugs of the engine. Where four separate coils are used as in Fig. 15, the high tension distributer may be removed and a plain cap inserted in its place. In this figure the numeral 75 indicates the low tension distributer which is connected by means of the wire 76 with the source of current supply and by means of four wires 77 to 80 inclusive with the four coils 81 to 84 inclusive. These coils also having a mutual connection with the current supply and four wires 86 to 89 inclusive leading to the four spark plugs.

Having thus described my invention, what I claim as new and desire to secure by Letters Patent of the United States, is as follows:—

1. An automatic spark producing apparatus for explosion engines comprising a revoluble member timed to the engine, a series of primary contact segments, a brush carried by the timed member to contact with said segments, a weighted curved spring arranged substantially concentric with the revoluble member and secured at one end thereto and having its other end free and connected with said brush to automatically advance or retard the spark, a high tension ring, a series of high tension segments, and a connection between the ring and segments carried by the revoluble member, whereby the high tension current is delivered to the spark plugs at the proper times.

2. An automatic spark producing apparatus for explosion engines comprising a revoluble member timed to the engine, a series of contacts, a series of weights, a spring connected with the revoluble member and encircling said weights, and a brush carried by a holder in contact with one of the weights whereby the brush will be advanced as the spring expands.

3. An automatic spark producing apparatus for explosion engines comprising a revoluble member timed to the engine, a series of contacts, a series of weights, a flat spring connected at one end to the revoluble member and surrounding the weights, a brush holder, a connection between the brush holder and the last weight of the series whereby the brush is advanced as the spring expands, and means to prevent the spring from expanding more than a fixed amount.

4. An automatic spark producing and advancing mechanism comprising a revoluble member timed to the engine, a spring encircling said member and rigidly connected thereto at one end; weights carried by said spring, a brush and brush holder movable with respect to the revoluble member, a connection between the brush holder and free end of the spring whereby the brush is advanced as the spring opens, a series of contact segments, a high tension distributer carried by the revoluble member and other contact segments to which the high tension current is delivered.

5. An automatic spark producing and advancing mechanism comprising a revoluble member timed to the engine, a series of low tension contacts, a brush holder carrying a brush to pass over the low tension contacts, a spring encircling the rigid member and connected thereto at one end, weights carried by the spring, a connection between the brush holder and spring at the free end of the spring whereby the position of the brush is advanced as the spring expands, a fixed high tension brush carried by the revoluble member and contacts over which the latter brush passes to distribute the current delivered thereto.

6. An automatic spark producing and advancing mechanism comprising a revoluble member, a spring secured thereto and encircling it, means to prevent the spring from expanding too far, a series of contact segments, a brush holder, a brush therein, a connection between the brush holder and spring whereby the brush is advanced as the spring expands, and a series of weights encircled by said spring, the weights being symmetrically positioned around the revoluble member.

7. An automatic spark producing and advancing mechanism comprising a revoluble member, a brush holder movably mounted thereon, a spring one end of which is secured to the revoluble member, weights carried thereby, and a connection with the other end of said spring and the brush holder whereby the position of the brush holder is varied as the spring expands and contracts.

8. An automatic spark producing apparatus for explosive engines comprising a revoluble member timed to the engine, a series of contacts, a brush carried by the timed member to contact with the said contacts, a weighted curved spring arranged substantially concentric with the revoluble member and connected at one end thereto and having its other end free and connected with the said brush, said spring being movable outwardly by centrifugal force and inwardly by its spring action for automatically advancing and retarding the spark as the speed of said member increases and decreases, and a substantially rigid ring partially encircling the spring and arranged to limit the expansion or outward movement of the spring.

9. An automatic spark producing apparatus for explosive engines comprising a revoluble member timed to the engine, a cylindrical casing, a series of primary contacts mounted on the casing, a substantially flat ring secured within the casing, an insulated cover cap mounted on the said ring and having a high tension ring and provided with high tension contacts, a brush carried by the revoluble member, a weighted curved spring arranged substantially concentric with the revoluble member and connected at one end to the same and also connected with the brush, and separate brushes carried by the revoluble member and arranged to contact with the tension ring and the high tension contacts.

10. An automatic spark producing apparatus for explosive engines comprising a shaft timed to the engine, a boss mounted on the shaft and provided with an annular groove, a brush holder having a brush and provided with a spring encircling the boss in the groove thereof, a series of contacts arranged in the path of the brush, and a weighted curved spring mounted on the boss and arranged substantially concentric with the shaft and connected with the brush holder.

11. An automatic spark producing apparatus for explosive engines comprising a shaft timed to the engine, a boss mounted on the shaft and provided with an annular groove, a brush holder having a brush and provided with a spring encircling the boss in the groove thereof, a series of primary contacts arranged in the path of the brush, a weighted curved spring mounted on the boss and arranged substantially concentric with the shaft and connected with the brush holder, a high tension ring, a series of high tension contacts, and a block carried by the said boss and provided with brushes arranged to engage the high tension ring and the high tension contacts.

In testimony whereof I have hereunto set my hand this 11th day of November, A. D. 1916.

HARRY T. ROBERTS.